United States Patent
Gordon

(10) Patent No.: US 6,474,921 B1
(45) Date of Patent: Nov. 5, 2002

(54) TWO PART TWIST FASTENER

(75) Inventor: Gary G. Gordon, Novi, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/907,346

(22) Filed: Jul. 17, 2001

(51) Int. Cl.[7] .......................... F16B 13/04; F16B 13/06
(52) U.S. Cl. ..................... 411/508; 411/45; 411/509; 411/913
(58) Field of Search ........................... 411/41, 45, 46, 411/48, 508, 509, 510, 913

(56) References Cited

U.S. PATENT DOCUMENTS

| | | | | |
|---|---|---|---|---|
| 4,391,559 A | * | 7/1983 | Mizusawa | 411/45 |
| 5,211,519 A | * | 5/1993 | Saito | 411/45 |
| 5,507,545 A | * | 4/1996 | Krysiak | 411/41 X |
| 5,850,676 A | * | 12/1998 | Takahashi et al. | 411/508 X |
| 6,007,285 A | | 12/1999 | Sisto et al. | |
| 6,176,660 B1 | * | 1/2001 | Lewis et al. | 411/45 |

* cited by examiner

Primary Examiner—Neill Wilson
(74) Attorney, Agent, or Firm—Tarolli, Sundheim, Covell, Tummino & Szabo L.L.P.

(57) ABSTRACT

A two part fastener (10) for clamping together first and second members (20, 22) that have an opening (40). The fastener (10) comprises a base (12) having a plurality of legs (80, 90) resiliently biased outwardly away from each other and insertable through the opening (40). A knob (14) connected with the base (12) is manually rotatable relative to the base to control the position of the legs (80, 90). The knob (14) has a first position of rotation relative to the base (12) in which blocking portions (80, 90) of the legs are in a blocking position to block removal of the legs through the opening (40). In a second position of rotation the knob (14) blocks inward movement of the blocking portions (88, 98) of the legs (80, 90) from the blocking position, thereby blocking removal of the fastener 10. In a third position of rotation the knob (14) holds the blocking portions (88, 98) of the legs (80, 90) inward from the blocking position, thereby enabling removal of the fastener (10).

10 Claims, 4 Drawing Sheets

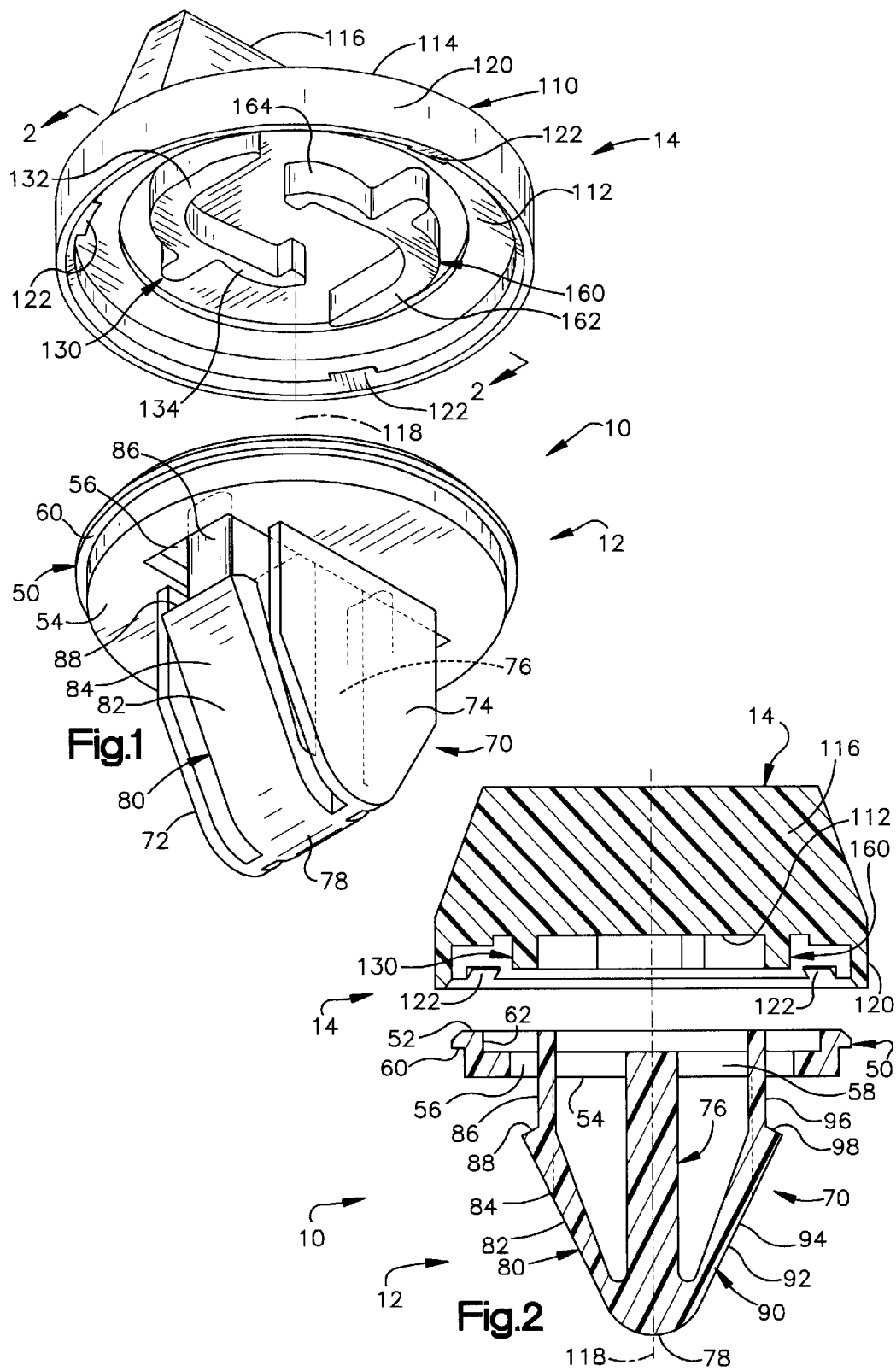

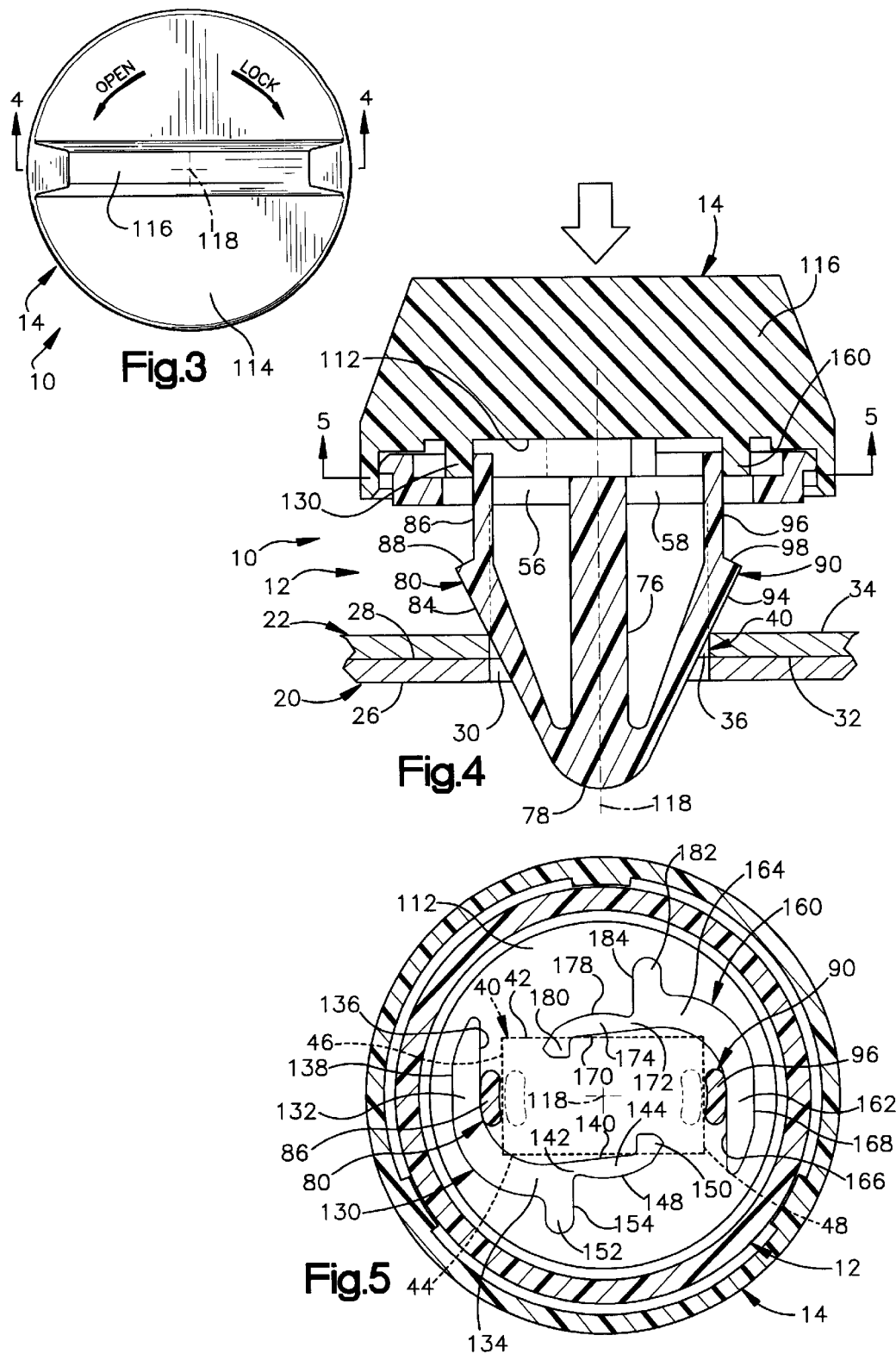

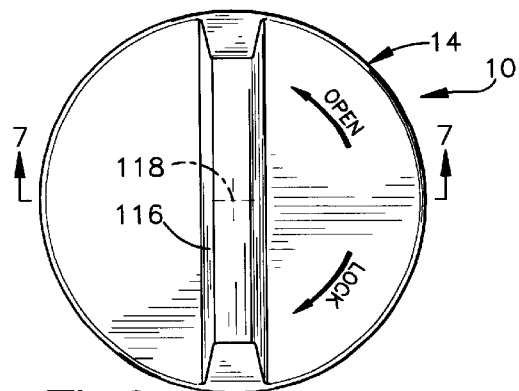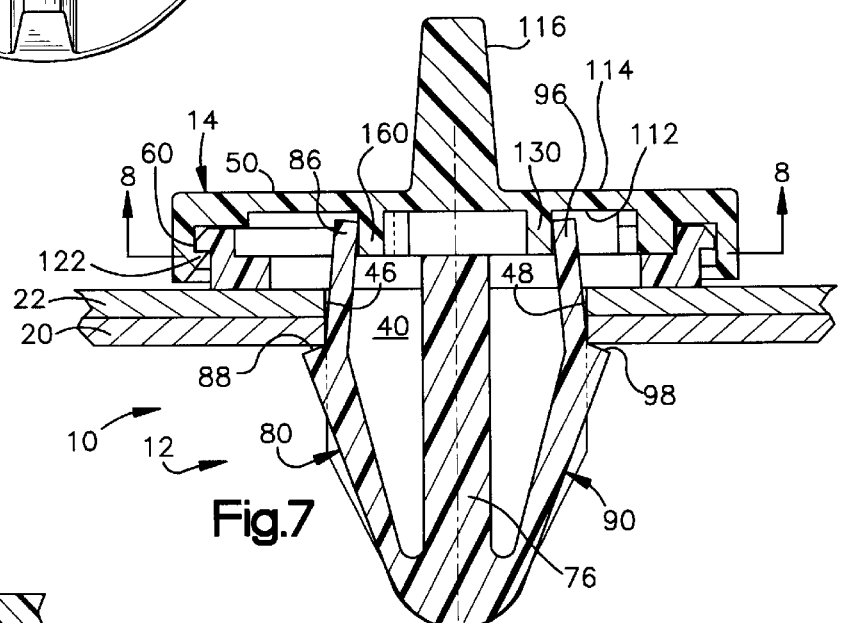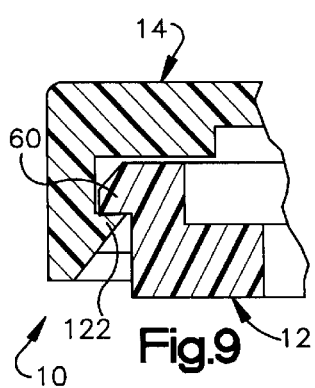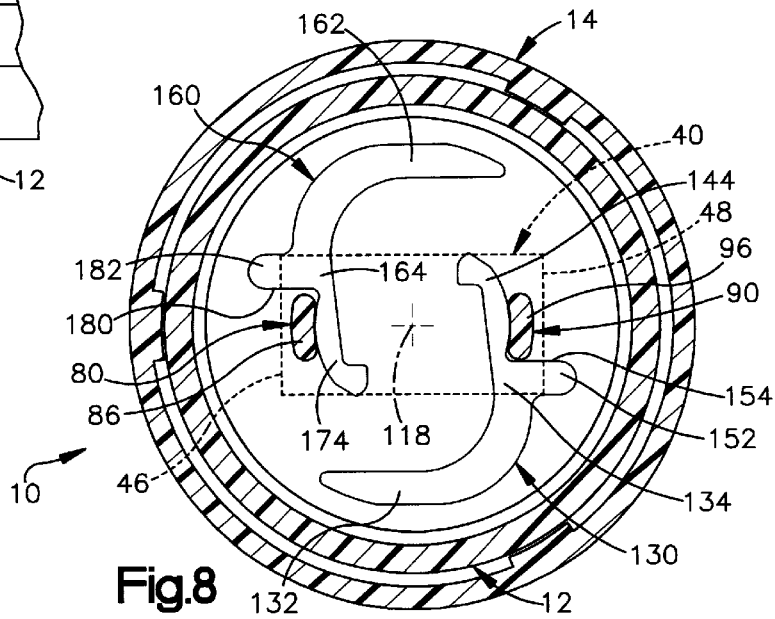

TWO PART TWIST FASTENER

BACKGROUND OF THE INVENTION

1. Technical Field

The present invention relates to a two part twist fastener for releasably securing a first member to a second member.

2. Description of the Prior Art

In many applications it is necessary to fasten together two members, such as panels or plates, in a releasable manner. For example, a vehicle door typically includes at least two panels that must be fastened securely together, but must also be removable from each other. Many different types of releasable fasteners have been developed for this type of application.

SUMMARY OF THE INVENTION

The present invention is a two part fastener for clamping together first and second members in an overlying relationship. The first and second members have surfaces defining an opening extending through the first and second members. The fastener comprises a base insertable into the opening. The base has a plurality of legs resiliently biased outwardly away from each other and movable between a plurality of positions relative to the first and second members. The legs are insertable through the opening. The fastener also comprises an actuator connected with the base and manually rotatable relative to the base to control the position of the legs of the base relative to the first and second members. The actuator has a first position of rotation relative to the base in which blocking portions of the legs are in a blocking position to block removal of the legs through the opening. The actuator has a second position of rotation relative to the base in which the actuator blocks inward movement of the blocking portions of the legs from the blocking position, thereby blocking removal of the fastener through the opening. The actuator has a third position of rotation relative to the base in which the actuator holds the blocking portions of the legs inward from the blocking position, thereby enabling removal of the fastener from the first and second members through the opening.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 1 is an exploded perspective view of a fastener in accordance with the invention;

FIG. 2 is an exploded sectional view of the fastener of FIG. 1, taken generally along line 2—2 of FIG. 1;

FIG. 3 is a top plan view of the fastener of FIG. 1, shown in a first condition;

FIG. 4 is a sectional view taken generally along line 4—4 of FIG. 1 showing the fastener in a first condition for insertion into an opening of members to be fastened together;

FIG. 5 is a sectional view taken generally along line 5—5 of FIG. 4 showing parts of the fastener in the first condition;

FIG. 6 is a top plan view of the fastener of FIG. 1, similar to FIG. 3, showing the fastener in a second or locking condition;

FIG. 7 is a sectional view similar to FIG. 4 showing the fastener in the second or locking condition;

FIG. 8 is a sectional view similar to FIG. 5 showing parts of the fastener in the second condition;

FIG. 9 is an enlarged view of a portion of FIG. 7;

DETAILED DESCRIPTION OF THE INVENTION

Figure 10:
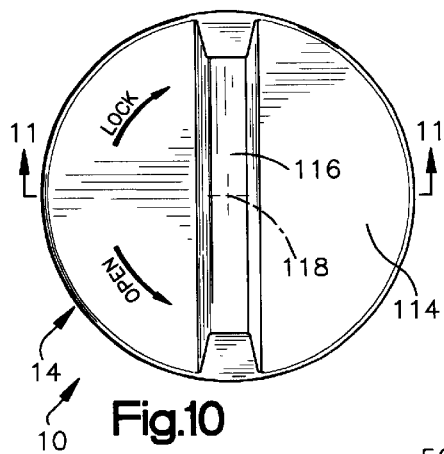
FIG. 10 is a top plan view of the fastener of FIG. 1, similar to FIG. 3, showing the fastener in a third or release condition.

The present invention relates to a two part twist fastener for releasably securing a first member to a second member. The present invention is applicable to different fastener constructions. As representative of the present invention, FIG. 1 illustrates a two-part fastener 10 in accordance with the invention. The fastener includes a base 12 and a knob 14.

The fastener is used for releasably securing together two or more members in an overlying relationship. In the illustrated embodiment, the fastener is used for releasably securing together a first member 20 (FIG. 4) and a second member 22. The first and second members 20 and 22 may be, for example, portions of a vehicle door, such as a support panel and a trim panel, or may be two plates or other pieces.

The first member 20 (FIG. 4) has opposite inner (that is, away from the side of entry of the fastener, or to the bottom as viewed in FIG. 4) and outer major side surfaces 26 and 28. The first member 20 has a rectangular slot 30 extending between the inner and outer major side surfaces 26 and 28. The second member 22 has opposite inner and outer major side surfaces 32 and 34. The inner major side surface 32 of the second member 22 is in abutting engagement with the outer major side surface 28 of the first member 20.

The second member 22 (FIG. 4) has a rectangular slot 36 extending between the inner and outer major side surfaces 32 and 34. The slot 36 in the second member 22 is preferably similar or identical in configuration to the slot 30 in the first member. The slot 36 in the second member 22 overlies the slot 30 in the first member 20 and together they form an opening 40 in the two members 20 and 22. The opening 40 has a width extending between first and second edge surfaces 42 and 44 (FIG. 5), and a length extending between third and fourth edge surfaces 46 and 48. The fastener 10 extends into the opening 40 in a manner described below to clamp the first member 20 to the second member 22.

The base 12 (FIGS. 1 and 2) of the fastener 10 is preferably molded as one piece from a plastic material, but could alternatively be made from a different material or in a different manner. The base 12 includes a planar, disk-shaped main body portion 50 centered on an axis 118. The main body portion 50 has an outer major side surface 52 (FIG. 2) and an inner major side surface 54. The main body portion 50 also has two rectangular openings 56 and 58 spaced apart from each other.

The outer periphery of the main body portion 50 has an inwardly facing shoulder 60, for engagement by the knob 14 in a manner described below. The main body portion 50 also has an outwardly facing shoulder 62, for engagement by the knob 14 in a manner described below.

The base 12 includes a retainer assembly 70 that depends from the main body portion 50 and that is movable into the opening 40 in the first and second members 20 and 22, as described below. The retainer assembly 70 includes two guide plates 72 and 74 that depend from the main body portion 50 on opposite sides of the two openings 56 and 58. The retainer assembly 70 also includes a central support post 76 that depends from the main body portion 50 between the two openings 56 and 58. The support post 76 has a rectangular cross-sectional configuration terminating in a curved lower end portion 78 for ease of insertion into the slot opening 40.

The retainer assembly 70 further includes two engagement members 80 and 90 for engaging the inner side surface 26 of the first member 20. The two engagement members 80 and 90 are formed as resilient retaining legs that extend from the lower end portion 78 of the central support post 76, in a direction toward the main body portion 50 of the base 12. The two retaining legs 80 and 90 are mirror images of each other, and are resiliently biased outward, away from each other.

The first retaining leg 80 is resiliently supported on the central support post 76. The first retaining leg 80 has a base portion 82 that extends upward and outward from the lower end portion 78 of the support post 76. The base portion 82 has a rectangular cross-sectional configuration. The base portion 82 has a cam surface 84 that faces outward away from the support post 76.

The first retaining leg 80 has an upper end portion 86 that extends upward from the base portion 82. The upper end portion 86 extends past the plane of the main body portion 50 and through the opening 56 in the main body portion. The upper end portion 86 has a kidney-shaped cross-sectional configuration (FIG. 5).

The first retaining leg 80 also has a blocking portion or blocking surface 88 (FIG. 2) that extends between the upper end portion 86 and the cam surface 84 of the base portion 82. The blocking surface 88 faces outward, that is, away from the central support post 76.

The second retaining leg 90 is a mirror image of the first retaining leg 80. The second retaining leg 90 is resiliently supported on the central support post 76. The second retaining leg 90 has a base portion 92 that extends upward and outward from the lower end portion 78 of the support post 76. The base portion 92 has a rectangular cross-sectional configuration. The base portion 92 has a cam surface 94 that faces outward away from the support post 76.

The second retaining leg 90 has an upper end portion 96 that extends upward from the base portion 92. The upper end portion 96 extends past the plane of the main body portion 50 and through the opening 58 in the main body portion. The upper end portion 96 has a kidney-shaped cross-sectional configuration.

The second retaining leg 90 also has a blocking portion or blocking surface 98 that extends between the upper end portion 96 and the cam surface 94 of the base portion 92. The blocking surface 98 faces outward, that is, away from the central support post 76.

The knob 14 (FIGS. 1 and 2) is preferably molded as one piece from the same plastic material as the base 12, but could alternatively be made from a different material or in a different manner. The knob 14 includes a planar, disk-shaped main body portion 110 having opposite inner and outer major side surfaces 112 and 114. A rib-shaped finger grip 116 projects from the outer side surface 114 of the main body portion 110. The finger grip 116 is manually engageable to effect rotation of the knob 14 about an axis 118 relative to the base 12.

The knob 14 has an annular, outer peripheral rim 120 that extends from the main body portion 110. Three snap retainers 122 extend from the rim 120. The snap retainers 122 are engageable with the base 12, in a manner described below, to retain the knob 14 on the base.

Two identical tracks 130 and 160 are formed on the inner major side surface 112 of the main body portion 110 of the knob 14. The tracks 130 and 160 are in the form of curved ridges or ribs that project from the inner major side surface 112.

The first track 130 (FIG. 5) has an overall L-shaped configuration including a first arm 132 and a second arm 134 that extends generally perpendicular to the first arm 132. The first arm 132 has an inner side surface 136 facing the axis 118, and an opposite outer side surface 138.

The second arm 134 has an inner side surface 140 that is a continuation of the inner side surface 136 of the first arm 132 and that also faces the axis 118. The second arm 134 jogs inward at 142, so that an end portion 144 of the second arm is located radially inward of the remainder of the second arm. The end portion 144 has an outer side surface 148. The end portion 144 terminates in a curled end 150 of the first track 130.

At the location of the jog 142, the second arm 134 has a stop rib 152 that projects outward. The stop rib 152 has a stop surface 154 that faces away from the first arm 132 and toward the end portion 144 of the second arm 134. The stop surface 154 extends generally perpendicular to the end portion 144 of the second arm 134 and to the outer side surface 148 of the end portion.

The second track 160 has the same configuration as the first track 130 but is located 180 degrees circumferentially about the axis 118 from the first track. The second track 160 has an overall L-shaped configuration including a first arm 162 and a second arm 164 that extends generally perpendicular to the first arm.

The first arm 162 has an inner side surface 166 facing the axis 118, and an opposite outer side surface 168. The second arm 164 has an inner side surface 170 that is a continuation of the inner side surface 166 of the first arm 162 and that also faces the axis. The second arm 164 jogs inward at 172, so that an end portion 174 of the second arm is located radially inward of the remainder of the second arm. The end portion 174 has an outer side surface 178. The end portion 174 terminates in a curled end 180 of the second track 160.

At the location of the jog 172, the second arm 164 has a stop rib 182 that projects outward. The stop rib 182 has a stop surface 184 that faces away from the first arm 162 and toward the end portion 174 of the second arm 164. The stop surface 184 extends generally perpendicular to the end portion 174 of the second arm 164 and to the outer side surface 178 of the end portion.

The first and second tracks 130 and 160 are positioned on the knob 14 so that each is engageable with the end portions 86 and 96 of the first and second retaining legs 80 and 90, respectively, of the base 12, in a manner described below, when the knob is rotated to different positions relative to the base.

The fastener 10 is assembled by snapping the knob 14 onto the base 12. The snap retainers 122 (FIGS. 7 and 9) on the knob 14 engage the shoulder 60 of the base 12 to block removal of the knob from the base. The knob 14 is supported on the base 12 for rotation relative to the base about the axis 118. The knob 14 and base 12 are both symmetrical about the axis 118, so that the knob can be assembled to the base in either of two starting positions 180 degrees apart.

When the knob 14 is assembled on the base 12, and prior to insertion of the fastener 10 into the opening 40, the parts of the fastener are in an assembled condition shown in FIG. 4 and in solid lines in FIG. 5. The first retaining leg 80 is biased outwardly and engages the inner side surface 136 of the first arm 132 of the first track 130. The second retaining leg 90 is biased outwardly and engages the inner side surface 166 of the first arm 162 of the second track 160.

When the fastener 10 is thereafter inserted into the opening 40 in the first and second members 20 and 22, the parts of the fastener assume a first condition, or insertion condition. In the first condition, the parts of the fastener 10 are in substantially the same position as in the assembled condition shown in FIG. 4 and in solid lines in FIG. 5, with the exception that the retaining legs 80 and 90 move inwardly, away from the tracks 130 and 160, into the position shown in dashed lines in FIG. 5.

Specifically, as the retainer assembly 70 of the fastener 10 is inserted into the opening 40 (shown in dashed lines in FIG. 5), the cam surfaces 84 and 94 on the retaining legs 80 and 90, respectively, engage the edge surfaces 46 and 48 of the opening 40, and cam the retaining legs inward from their as-molded condition, toward the axis 118.

Figure 12:
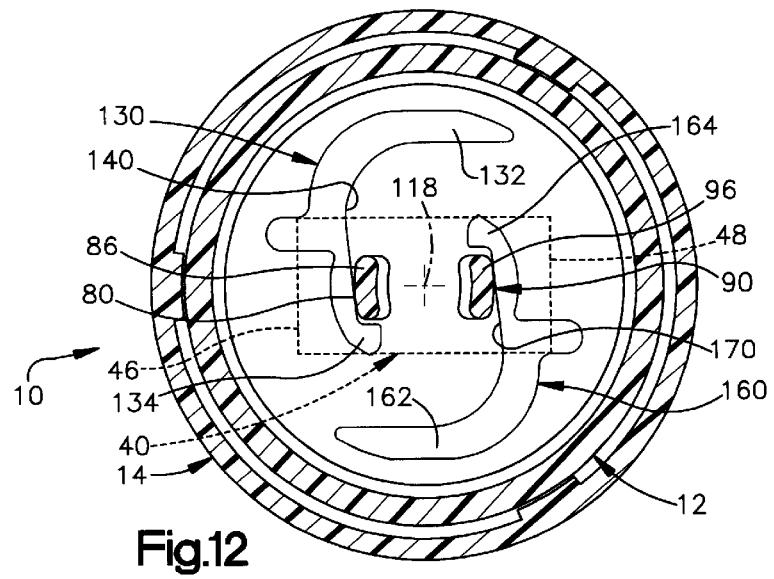
FIG. 12 is a sectional view similar to FIG. 5 showing parts of the fastener in the third condition.

The fastener 10 moves axially into the opening 40 until the inner side surface 54 of the main body portion 50 of the base 12 engages the outer side surface 34 of the second member 22, as shown in FIG. 12, to limit axial movement of the fastener in a direction into the opening.

During this movement, the retainer assembly 70 moves far enough into the opening 40 that the blocking surfaces 88 and 98 move past the edge surfaces 46 and 48. The retaining legs 80 and 90 spring back outward, away from the axis 118. The retaining legs 80 and 90 move outward until the end portions 86 and 96 of the retaining legs engage the edge surfaces 46 and 48 of the opening 40. The edge surfaces 46 and 48 of the opening 40 resist further lateral movement of the retaining legs 80 and 90. The blocking surface 88 on the first retaining leg 80 and the blocking surface 98 on the second retaining leg 90 engage the inner major side surface 26 of the first member 20. This engagement blocks or resists removal of the base 12 from the opening 40.

The blocking portions 88 and 98 of the legs 80 and 90 are thus in a blocking position to block removal of the legs through the opening 40. The retaining legs 80 and 90 can, however, be forced to bend inward to enable removal of the fastener 10 from the opening 40, if sufficient axial force is placed on the fastener. Therefore, the fastener 10 is not locked, and the members 20 and 22 are not securely clamped together.

To move the fastener 10 from the first condition to a second or locking condition, the knob 14 is rotated about 90 degrees relative to the base 12 in a first direction, as shown by the "LOCK" arrow in FIG. 6. When rotational force is placed on the finger grip 116 of the knob 14, the knob rotates relative to the base 12, but the base does not rotate in the opening 40 because of the engagement of the retaining legs 80 and 90 in the opening.

As the knob 14 rotates relative to the base 12, the first and second tracks 130 and 160 on the knob rotate relative to the retaining legs 80 and 90 of the base, in a counter-clockwise direction as viewed in FIG. 8 from the position shown in FIG. 5 to the position shown in FIG. 8. The first track 130 rotates away from the first retaining leg 80, and into engagement with the second retaining leg 90. Simultaneously, the second track 160 rotates away from the second retaining leg 90, and into engagement with the first retaining leg 80.

Specifically, the end portion 144 of the second arm 134 of the first track 130 engages the end portion 96 of the second retaining leg 90. The second arm 134 of the first track 130 slides along the second retaining leg 90 to a rotational position radially inward of the end portion 96 of the second retaining leg. The stop surface 154 on the stop rib 152 of the second arm 134 of the first track 130 engages the second retaining leg 90 to stop rotational movement of the knob 14. In this position of the parts, the first track 130 blocks inward movement of the end portion 96 of the second retaining leg 90, while the edge surface 46 or 48 of the opening 40 blocks outward movement of the second retaining leg.

Simultaneously, the end portion 174 of the second arm 164 of the second track 160 engages the end portion 86 of the first retaining leg 80. The second arm 164 of the second track 160 slides along the first retaining leg 80 to a rotational position radially inward of the end portion 86 of the first retaining leg. The stop surface 184 on the stop rib 182 of the second arm 164 of the second track 160 engages the first retaining leg 80 to stop rotational movement of the knob 14. In this position of the parts, the second track 160 blocks inward movement of the end portion 86 of the first retaining leg 80, while the edge surface 48 or 46 of the opening 40 blocks outward movement of the first retaining leg.

Thus, when the knob 14 is rotated to place the fastener 10 in the second or locked condition shown in FIGS. 6–8, the blocking portions 88 and 98 of the retaining legs 80 and 90, respectively, are in a blocking position (FIG. 7). The legs 80 and 90 are blocked from inward movement by the tracks 130 and 160 (FIG. 8), and are blocked from outward movement by the edge surfaces 46 and 48 of the opening 30. As a result, the retaining legs 80 and 90 are locked in the position shown in FIGS. 7 and 8. In this position, the retaining legs 80 and 90 can not be moved to a position to allow removal of the base 12 from the opening 40. Therefore, the retaining legs 80 and 90 block removal of the fastener 10 from the opening 30, and the first and second members 20 and 22 are clamped together.

To move the fastener 10 from the first condition to a third or release condition, the knob 14 is rotated about 90 degrees relative to the base 12 in a second direction opposite the first direction, as shown by the "OPEN" arrow in FIG. 10. (Alternatively, if the fastener 10 is in the locked condition, the knob 14 is rotated 180 degrees to move the fastener to the release condition).

As the knob 14 rotates relative to the base 12, the first and second tracks 130 and 160 on the knob rotate relative to the retaining legs 80 and 90 of the base, in a clockwise direction as viewed in FIG. 12 from the position shown in FIG. 5 to the position shown in FIG. 12. The first track 130 stays in engagement with the end portion 86 of the first retaining leg 80. The second track 160 stays in engagement with the end portion 96 of the second retaining leg 90.

Specifically, the inner side surface 140 of the second arm 134 of the first track 130 engages the end portion 86 of the first retaining leg 80. The second arm 134 of the first track 130 moves to a position radially outward of the end portion 86 of the first retaining leg 80, and bends the end portion of the first retaining leg inward, toward the axis 118 and away from the edge surface 46 of the opening 40. The first retaining leg 80 moves inward from the blocking position until its blocking surface 88 is clear of the edge surface 46 of the opening 40, as shown in FIG. 11.

Simultaneously, the inner side surface 170 of the second arm 164 of the second track 160 engages the end portion 96 of the second retaining leg 90. The second arm 164 of the second track 160 moves to a position radially outward of the end portion 96 of the second retaining leg 90. In this position, the second track 160 bends the end portion 96 of the second retaining leg 90 inward, toward the axis 118, and away from the edge surface 48 of the opening 40. The second retaining leg 90 moves inward from the blocking position until its blocking surface 98 is clear of the edge surface 48 of the opening 40, as shown in FIG. 11.

Figure 11:
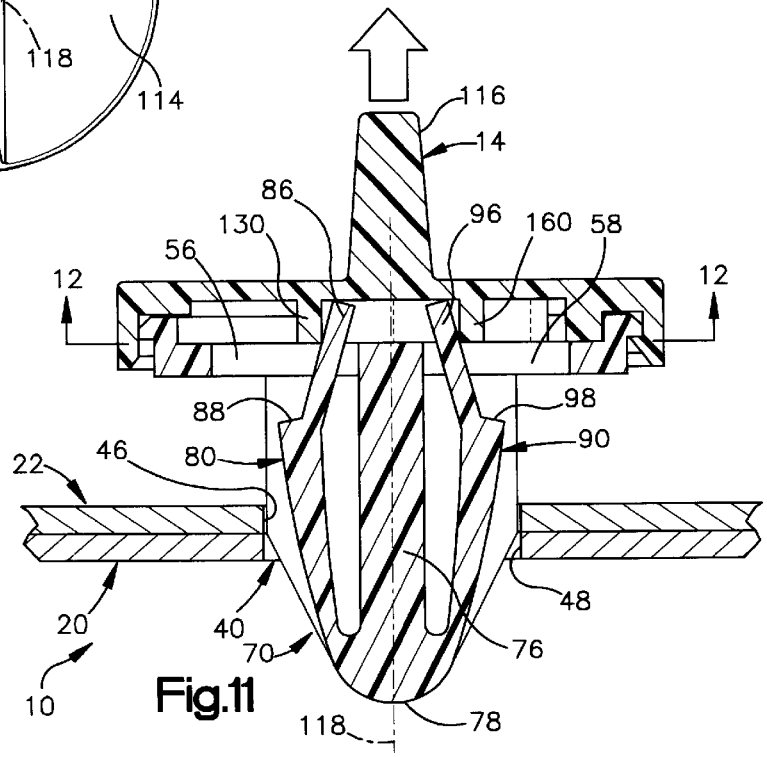
FIG. 11 is a sectional view similar to FIG. 4 showing the fastener in the third or release condition.

Thus, when the knob 14 is rotated relative to the base 12 so as to place the fastener 10 in the third or release condition shown in FIGS. 10–12, the retaining legs 80 and 90 do not block removal of the fastener 10 from the opening 40. The first and second members 20 and 22 are no longer clamped together, and the fastener 10 can be removed from the opening 40.

From the above description of the invention, those skilled in the art will perceive improvements, changes and modifications in the invention. Such improvements, changes and modifications within the skill of the art are intended to be covered by the appended claims.

Having described the invention, I claim:

1. A two part fastener for clamping together first and second members in an overlying relationship, said first and second members having surfaces defining an opening extending through said first and second members, said fastener comprising:
    a base insertable into said opening, said base having a plurality of legs resiliently biased outwardly away from each other and movable between a plurality of positions relative to said first and second members, said legs being insertable through said opening; and
    an actuator connected with said base and manually rotatable about an axis relative to said base to control the position of said legs of said base relative to said first and second members;
    said actuator having a first position of rotation relative to said base in which blocking portions of said legs are in a blocking position to block removal of said legs through said opening;
    said actuator having a second position of rotation relative to said base in which said actuator blocks inward movement of said blocking portions of said legs from said blocking position, thereby blocking removal of said fastener through said opening; and
    said actuator having a third position of rotation relative to said base in which said actuator holds said blocking portions of said legs inward from said blocking position, thereby enabling removal of said fastener from said first and second members through said opening.

2. A fastener as set forth in claim 1 wherein said actuator is rotated a predetermined amount in a first direction relative to said base to move said actuator from the first position of rotation to the second position of rotation, and is rotated a predetermined amount relative to said base in a second direction opposite said first direction to move said actuator from the first position of rotation to the third position of rotation.

3. A fastener as set forth in claim 2 wherein said actuator is rotated about ninety degrees in a first direction of rotation relative to said base to move said actuator from the first position of rotation to the second position of rotation, and is rotated about 90 degrees relative to said base in a second direction of rotation opposite said first direction of rotation to move said actuator from the first position of rotation to the third position of rotation.

4. A fastener as set forth in claim 2 wherein said actuator has two tracks for engaging said plurality of legs on said base, said first track being engaged with said first leg when said actuator is in the first and third positions, said second track being engaged with said first leg when said actuator is in the second position, said second track being engaged with said second leg when said actuator is in the first and third positions, and said first track being engaged with said second leg when said actuator is in the second position.

5. A fastener as set forth in claim 1 wherein said actuator has two track means that move into and out of engagement with said legs to control the position of said legs in said opening upon rotation of said actuator relative to said base.

6. A fastener as set forth in claim 5 wherein said track means comprises first and second tracks that are identical to each other and located 180 degrees circumferentially from each other about said axis.

7. A fastener as set forth in claim 1 wherein said plurality of legs on said base includes first and second legs each having an end portion, said actuator having a first portion comprising a first curved track portion in engagement with said end portion of said first leg to urge said blocking portion of said first leg to move inward or outward in response to rotation of said actuator relative to said base in respective opposite directions, said actuator having a second portion comprising a second curved track portion in engagement with said end portion of said second leg to urge said blocking portion of said second leg to move inward or outward in response to rotation of said actuator relative to said base in respective opposite directions.

8. A two part fastener for clamping together first and second members in an overlying relationship, said first and second members having surfaces defining an opening extending through said first and second members, said fastener comprising:
    a base insertable into said opening, said base having a plurality of legs resiliently biased outwardly away from each other and movable between a plurality of positions relative to said first and second members, said legs being insertable through said opening, said plurality of legs on said base including first and second legs each having an end portion and a blocking portion;
    an actuator connected with said base and manually rotatable relative to said base to control the position of said legs of said base relative to said first and second members;
    said actuator having a first portion comprising a first curved track portion in engagement with said end portion of said first leg to urge said blocking portion of said first leg to move inward or outward in response to rotation of said actuator relative to said base in respective opposite directions;
    said actuator having a second portion comprising a second curved track portion in engagement with said end portion of said second leg to urge said blocking portion of said second leg to move inward or outward in response to rotation of said actuator relative to said base in respective opposite directions;
    said actuator having a first position of rotation relative to said base in which said blocking portions of said legs are in a blocking position to block removal of said legs through said opening;
    said actuator having a second position of rotation relative to said base in which said actuator blocks inward movement of said blocking portions of said legs from said blocking position, thereby blocking removal of said fastener through said opening; and
    said actuator having a third position of rotation relative to said base in which said actuator holds said blocking portions of said legs inward from said blocking position, thereby enabling removal of said fastener from said first and second members through said opening.

9. A fastener as set forth in claim 8 wherein said actuator is rotated a predetermined amount in a first direction relative to said base to move said actuator from the first position of rotation to the second position of rotation, and is rotated a predetermined amount relative to said base in a second direction opposite said first direction to move said actuator from the first position of rotation to the third position of rotation.

10. A fastener as set forth in claim 9 wherein said actuator has two tracks for engaging said plurality of legs on said base, said first track being engaged with said first leg when said actuator is in the first and third positions, said second track being engaged with said first leg when said actuator is in the second position, said second track being engaged with said second leg when said actuator is in the first and third positions, said first track being engaged with said second leg when said actuator is in the second position.

\* \* \* \* \*